UNITED STATES PATENT OFFICE.

HERBERT RACTIVAN BROWNE, OF CADISHEAD, ASSIGNOR TO HIMSELF, AND MALCOLM GUTHRIE, OF LIVERPOOL, ENGLAND.

PROCESS OF MAKING SODA CRYSTALS.

SPECIFICATION forming part of Letters Patent No. 516,075, dated March 6, 1894.

Application filed July 8, 1893. Serial No. 479,946. (No specimens.) Patented in France August 23, 1893, No. 232,351; in Belgium August 24, 1893, No. 106,108, and in Austria-Hungary September 11, 1893, No. 31,026.

*To all whom it may concern:*

Be it known that I, HERBERT RACTIVAN BROWNE, a subject of the Queen of Great Britain and Ireland, residing at Roselea, Cadishead, in the county of Lancaster, England, have invented Improvements in the Manufacture or Production of Soda Crystals, (for which I have obtained Letters Patent in France, No. 232,351, dated August 23, 1893; in Austria-Hungary, No. 31,026, dated September 11, 1893, and in Belgium, No. 106,108, dated August 24, 1893,) of which the following is a specification.

By the electrolysis of sodic chlorid, soda is obtained in the form of caustic soda, while by the ammonia soda process it is obtained in the form of anhydrous carbonate of soda. For many purposes however it is preferred to use soda in the form of crystallized carbonate of soda, commonly called soda crystals.

Now this invention has reference to the manufacture or production of soda crystals in a simple and economical manner from the caustic soda liquor obtained by the electrolysis of brine and the partially finished alkaline product obtained in the ammonia-soda process. For this purpose there is added in suitable proportion to the caustic soda liquor obtained by the electrolysis of brine, a mixture of monocarbonate and acid carbonate of soda produced by heating the bicarbonate of soda obtained by the ammonia soda process, to a suitable temperature say from about 80° to 100° centigrade, until practically the whole of the ammonia present in the said bicarbonate of soda has been driven off. In this way the caustic soda will be converted into monocarbonate of soda by reaction with the acid or bicarbonate of soda contained in the mixture, and from the resulting liquor, monocarbonate of soda is obtained as soda crystals by crystallization in the ordinary or any suitable manner. The proportions of the substances used are preferably such as to result in the production of a liquor rich in monocarbonate of soda.

My invention may advantageously be carried out as follows:—The liquor resulting from the electrolysis of brine and which contains caustic soda in solution together with a proportion of undecomposed salt is introduced into a dissolving tank and heated to about 50° centigrade. To it is then added a mixture of monocarbonate and bicarbonate of soda obtained by heating the bicarbonate of soda of the ammonia soda process as described the quantity of the mixture used being such that the caustic soda in the liquor will be wholly converted into monocarbonate of soda by reaction with the bicarbonate of soda in the said mixture. This point can be ascertained by any suitable tests such as by the addition of a drop of the liquor in which the mixture has been dissolved, to a solution of silver nitrate when a black or brown coloration of the solution will be produced when caustic soda is present, but which coloration will cease to be produced when the proportion of mixture is such that the caustic soda is wholly converted into monocarbonate. To the mixture of liquor, and monocarbonate and bicarbonate of soda may advantageously be added about (2%) two per cent. of sulphate of soda (salt cake), and enough bleaching powder or bleach liquor to oxidize any coloring matter that may be present. The mixture is agitated in the dissolving tank for a suitable time say about three or four hours at the above mentioned temperature of 50° centigrade, until the added substances have been completely dissolved, and the liquor contains say about twenty-six per cent. of monocarbonate of soda. The insoluble portion is then removed it may be by settling, or by filtration and the remaining liquor is run off into one or more crystallizing pans where the main portion of the carbonate of soda will crystallize out as decahydrated carbonate of soda ($Na_2Co_3.10H_2O$) technically known as soda crystals. After crystallization has taken place, the supernatant liquor is run off, and the crystals are dried in any convenient way as for example by draining them and then drying them in a centrifugal hydro-extractor.

Bicarbonate of soda produced in the ammonia soda process may be added direct to the caustic soda liquor without being previously heated to transform it into a mixture of monocarbonate and acid carbonate of soda, but I do not consider this so advantageous a mode of carrying out the invention as the addition of the mixture of monocarbonate and acid carbonate of soda, as there would either result the loss of ammonium chlorid present in admixture with the bicarbonate, or the apparatus necessary for carrying out the invention would be more complicated if so constructed as to recover the ammonium chlorid.

What I claim is—

1. The herein described process of manufacturing soda crystals, which consists in dissolving a mixture of monocarbonate and bicarbonate of soda, produced by heating the bicarbonate of soda obtained by the ammonia soda process until practically the whole of the ammonia present therein has been driven off, in caustic soda liquor obtained by the electrolysis of brine, and crystallizing out the resulting monocarbonate of soda substantially as herein described.

2. The herein described process of manufacturing soda crystals which consists in heating bicarbonate of soda obtained by the ammonia soda process until it is converted into a mixture of monocarbonate and bicarbonate of soda and practically the whole of the ammonia present therein has been driven off; then dissolving the mixture of monocarbonate and bicarbonate of soda thus obtained in caustic soda liquor obtained by the electrolysis of brine, and crystallizing out the resulting monocarbonate of soda, substantially as herein described.

3. The herein described process of manufacturing soda crystals which consists in heating the residual caustic soda liquor obtained by the electrolysis of brine, adding to the heated liquor a mixture of monocarbonate and bicarbonate of soda produced by heating bicarbonate of soda obtained by the ammonia soda process, also adding sulphate of soda and a bleaching agent to said liquor, agitating the whole mass while heated until the added substances have been dissolved, removing insoluble matter, crystallizing out monocarbonate of soda from the remaining solution, and drying the resulting soda crystals substantially as herein described for the purpose specified.

In testimony whereof I have signed my name to this specification in the presence of two subscribing witnesses.

HERBERT RACTIVAN BROWNE.

Witnesses:
  HUGH HUGHES,
  T. W. NAYLOR,
*Clerks to Messrs. Stone, Fletcher & Hull, Solicitors, 6 Cook Street, Liverpool, England.*